United States Patent Office 3,473,996
Patented Oct. 21, 1969

3,473,996
WEATHER-STABLE LAMINATE
Henry F. Whalen, Jr., Plymouth Meeting, Pa., assignor to Rohm & Haas Company, Philadelphia, Pa., a corporation of Delaware
No Drawing. Filed Apr. 7, 1966, Ser. No. 540,848
Int. Cl. B44f 1/00; B32b 27/08
U.S. Cl. 161—6                         10 Claims

ABSTRACT OF THE DISCLOSURE

A laminate of a base of a rigid sheet of light sensitive plastic, covered on at least one surface by an opaque free film prepared from a multi-stage heterogeneous sequential acrylic copolymer and then covered with a clear free film laminated to the outside surface of the opaque film is provided. Outdoor weather resistance of the substrate and of written messages written on the opaque film is disclosed.

---

This invention relates to a novel plastic laminate having outstanding weatherability and a process for producing the laminate.

A number of plastic materials are available in the form of rigid sheets. As used herein, "rigid" does not denote a completely stiff, unbending material, but rather a material which differs in kind and not merely degree from the highly flexible plastic films used for packaging and wrapping. To obtain the necessary degree of rigidity, the plastic sheet must be about 10 mils thick or greater, with a thickness of 20 mils or more being preferred. The precise minimum thickness will vary with the nature of the plastic, the extent of pigmentation and the presence (or absence) of plasticizers. These plastic sheet materials, usually pigmented white, are widely used for carrying printed messages of various sorts. The plastic most commonly used in such rigid sheet construction is a vinyl chloride-vinyl acetate copolymer. However, a number of other plastics are available for such use including, for example, rigid or semirigid homopolymers of vinyl chloride, the ABS polymers (i.e., acrylonitirile-butadiene-styrene), polystyrene, nylon, polycarbonates and ABS-PVC ("PVC" stands for polyvinyl chloride) blends. To protect the printed message, the sheet is generally overlaid with a thin, clear plastic film using a hot press to laminate the materials together. Such laminates are used in the manufacture of credit cards and other applications wherein the material is subjected to a minimum amount of exposure to sunlight.

Although substantial applications for such laminates exit as for outdoor advertising, displays and warning signs, pipeline markers, identification tags, instruction plates, etc., such plastic laminates have been completely unsuited for any use involving significant exposure to sunlight. The prime reason for this is the very high degree of susceptibility of the plastic materials to degradation when exposed to ultraviolet radiation. Thus, a regular pigmented rigid vinyl chloride-vinyl acetate copolymer sheet overlaid with a clear PVC film is degraded in a matter of a few weeks when exposed to direct sunlight. The use of clear acrylic films containing appropriate amounts of an ultraviolet absorber have extended the exposure life of such laminates. In terms of outdoor durability, such a short useful life in many instances is much too short by several orders of magnitude for a commercially acceptable product. Similarly other inexpensive substitutes for vinyl chloride-vinyl acetate copolymers such as rigid and semirigid PVC homopolymers, nylons, styrene polymers, ABS polymers, polycarbonates, ABS-PVC blends, etc. also are subject to degradation when exposed to UV.

It has now been discovered that the inexpensive, light-sensitive plastic materials useful as rigid sheet materials can be used in the production of laminates having outstanding resistance to ultraviolet by using a double protective laminate as hereinafter described. The laminates of the invention are characterized by a useful outdoor life measured in terms of many years rather than the limited durability as heretofore.

In accordance with the invention the surface of the sheet of plastic material to be protected is laminated with an opaque pigmented film of a heterogeneous emulsion copolymer (hereinafter referred to as film A). Although adhesives may be used in laminating film A to the plastic substrate to be protected, they are not necessary, and desirably are omitted. The design or printed message, when desired, is placed on the free surface of film A and then a clear acrylic film (hereinafter referred to as film B), which desirably contains an ultraviolet stabilizer, is then laminated to the outer (generally printed) surface of film A without the use of any bonding adhesive.

Film A is a multi-stage heterogeneous sequential copolymer prepared in at least four separate polymerization stages which comprises from 10 to 75% by weight of a first-stage rubbery, uniformly crosslinked polymer of an alkyl acrylate having 2 to 8 carbon atoms in the alkyl group and a maximum glass transition temperature of $-20°$ C. and 90 to 25% by weight of subsequently polymerized stages containing gradually diminishing amounts of $C_2$–$C_8$ alkyl acrylate and gradually increasing amounts of a $C_1$–$C_4$ alkyl methacrylate. These polymers, a process for their production and for producing films therefrom are set forth in detail in copending U.S. Patent application Ser. No. 526,038 (now abandoned) filed on Feb. 9, 1966 by Charles Francis Ryan which is incorporated herein by reference thereto. As is disclosed in said copending application, each subsequent stage component partially or completely encompasses or penetrates to some degree into the particles obtained by the polymerization of a prior stage or stages.

The film must contain sufficient pigment and/or filler or dye to render the film opaque. The minimum amount necessary for opacity is dependent not only on the nature of the pigment but also on the thickness of the film which is used, i.e., a higher quantity of pigment is needed to render a one mil film opaque than is needed for a film 10 mils thick. Common pigments which may be used in the preparation of film A include, for example, titanium dioxide, zinc oxide, cadmium reds, chrome oranges and yellows, phthalocyanine greens and blues, etc. Dyes and common fillers such as silica, ground and precipitated carbonates, barytes, diatomaceous earth, various clays, etc. may be used in conjunction with the pigment as known to those skilled in the art. Hereafter, the films will be discussed in terms of their "pigment" content, but it is understood that a portion of the "pigment" content may be technically classified as a filler or dye. Generally at least about 5% by weight of such pigment is needed to render the film opaque, and for the thinner films a larger amount may be necessary.

The maximum amount of pigment which may be incorporated in the film is not critical, although generally no more than about 25% should be present. The maximum level of pigment incorporation is mainly determined by the decrease in physical properties of the film as a function of increasing pigment level, i.e., as the pigment level increases the flexibility and impact strength of the film decreases. Moreover, at higher pigment levels it is increasingly difficult to obtain adequate adhesion between the film and the rigid plastic sheet by the use of heat and pressure, i.e., a separate adhesive must be used. Preferably the film contains about 12 to 20% pigment by weight.

Film A must be sufficiently thick to permit physical handling. Maximum thickness of the film is limited primarily by economic considerations and also by the necessity of maintaining sufficient flexibility in the film so as to assist in the laminating operation, i.e., film A should not, itself, be a rigid plastic sheet. It has been found that films or sheets having a thickness of 1 to 10 mils possess the combination of properties desired. Ordinarily the films are prepared by calendering, extrusion casting or extrusion-blowing techniques well known in the art. For example, temperatures range from 375° F. to 500° F. The films may also be formed by compression-molding as disclosed in said copending application of C. F. Ryan.

The composition of film B is not as critical as is the case with film A. Any clear, thermoplastic acrylic film having a glass transition temperature of from 20° C. to 80° C. may be used. Preferably the acrylic polymer constituting the film has a glass transition temperature of from about 30 to 65° C. and has a matte finish. (By "acrylic polymer" is meant a homopolymer or copolymer of acrylic or methacrylic monomers.) A preferred group of acrylic polymers and a process for the preparation of films from such polymers is described in a United States patent application Ser. No. 537,000 now Patent No. 3,415,796, filed by L. C. Souder, J. A. Powell and F. A. Hajduk on Mar. 24, 1966 for "Extruded Matte Finish Acrylic Film" which is incorporated herein by reference thereto.

As therein described, the acrylic monomers may be polymerized by conventional suspension, emulsion, bulk or batch polymerization processes. The preferred polymers, in addition to having a glass transition temperature as specified, also possess a melt index of 0.1 to 3. Films are produced from these polymers by conventional extrusion and blowing technique as described in said copending application. The preferred films have a matte finish which renders the films particularly suitable for laminating to film A by the use of heat and pressure without the use of a separate adhesive. While the films having a matte finish are preferred as herein described, other clear films of acrylic polymers having a $T_g$ as defined may also be used for film B. The thickness of the film is not critical. Generally, the film will be from about 0.5 to 5 mils thick. Thicker films may be used, but are economically disadvantageous. If desired, an ultraviolet absorber which does not interfere with the clarity of the film may be incorporated therein. Representative examples of such UV absorbers include, for example, 2,4 - dihydroxybenzophenones: 2-(2'-hydroxy-5'-methylphenyl)benzotriazole; and 4 - dodecyloxy - 2 - hydroxybenzophenone.

In the specification and in the followiing example, all parts and percentages are on a weght basis unless otherwise mentioned.

EXAMPLE

Preparation of Film A

To a reactor equipped with stirrer, thermometer, nitrogen sweep, inlets for monomer addition, and reflux condenser, are chargd 1000 parts deionized water, 41.6 parts of a 10% solution of sodium octylphenoxypolyethoxy sulfonate emulsifier (containing two ethylene oxide units), 0.14 part of acetic acid, 139 parts of butyl acrylate, 1.39 parts of 1,3-butylene glycol diacrylate, and 0.12 part of diisopropylbenzene hydroperoxide. The mixture is vigorously degassed with nitrogen for 90 minutes at 30° C. and, while degassing over the surface is continued, a solution of 0.015 part sodium sulfoxylate formaldehyde in 20 parts water is added gradually and polymerization of the first stage monomers carried out to substantial completion over a period of about 30 minutes. The reaction mixture is then heated to 85° C. at which point a solution of 0.14 part sodium sulfoxylate formaldehyde in a small amount of water is added, followed by gradual addition at 85° C. for one hour of a mixture of 0.28 part diisopropylbenzene hydroperoxide, 55.4 parts butyl acrylate, and 83.2 parts of methyl methacrylate. After the monomer addition is complete, the mixture is stirred for 30 minutes at 85° C. and polymerization of the second-stage monomers is carried out to substantial completion.

A third stage is then added under conditions similar to the second stage. After addition of a solution of 0.14 part sodium sulfoxylate formaldehyde in 20 parts water, a mixture of 14.1 parts butyl acrylate, 125 parts methyl methacrylate, 0.277 part diisopropylbenzene hydroperoxide, and 0.35 part n-dodecyl mercaptan is added over a period of one hour. After monomer addition is complete, the temperature is maintained at 85–90° C. over a 30-minute period and polymerization of the third-stage monomers substantially completed. There is then added a solution of sodium sulfoxylate formaldehyde (0.277 part in 1 part water) followed by the addition at 85–90° C. over a one-hour period of a mixture of 2.77 parts butyl acrylate, 136 parts methyl methacrylate, 5.5 parts methacrylic acid, 1.1 parts diisopropylbenzene hydroperoxide and 1.39 parts t-dodecyl mercaptan. After addition is complete, the reaction temperature is maintained at 85–90° C. for one hour and polymerization of the fourth-stage monomers substantially completed. The emulsion is then cooled and the polymer product is isolated from emulsion by addition thereof to an equal weight of water containing 5% sodium chloride, then filtered and dried thoroughly in a vacuum oven. The polymer product has a melt index of 0.8.

Fifteen parts of titanium dioxide are then milled with 100 parts of the polymer in a Henschel mixer to produce a uniform pigmented mixture. The pigmented polymer is extruded and blown into a 3-mil film.

Preparation of Film B

A bulk polymerized copolymer of 64% methyl methacrylate and 36% ethyl acrylate having a melt index of 2.0 and a glass transition temperature of about 46° C. and containing 1% of 4-dodecyloxy-2-hydroxybenzophenone is extruded and blown into tubular film using a 1" extruder equipped with a 1½" annular die maintained at a die temperature of 450° F., the extrusion rate being 10 to 12 pounds per hour. The blow-up ratio is maintained between 2 and 3 to 1. The vertically moving "bubble" or blown tube is lightly cooled with air from a cooling ring just about the die exit. The tube is then gradually collapsed and taken through a pair of nip rolls to a windup reel. The film so produced is 3 mils thick.

Laminate production

Film A is placed on top of a sheet 26 mils thick of a commercial rigid vinyl chloride-vinyl acetate copolymer pigmented white and the resulting sandwich placed between matte-finished metal cauls and then subjected to the following pressing cycle in a hydraulic press:

(1) 1200 p.s.i.—300° F. for 5 minutes
(2) 1200 p.s.i.—full cooling to room temperature—7 minutes
(3) Pressure release—laminate removal.

A message is then lithographed on the free surface of film A. After the ink dries, film B is placed on to of film A, the resulting sandwich placed between polished metal cauls and then subjected to the following pressing cycle:

(1) 1700 p.s.i.—330° F. for 5 minutes
(2) 1700 p.s.i.—full cooling to room temperature—9 minutes
(3) Pressure release—laminate removal.

The laminate so produced displays outstanding resistance to degradation by ultraviolet light out-performing other protective laminate constructions including rigid vinyl chloride-vinyl acetate with an overlay of the same resin, rigid vinyl chloride-vinyl acetate protected only by an opaque pigmented acrylic film and rigid vinyl chloride-vinyl acetate protected only by a clear acrylic film wherein an ultraviolet absorber is present in the clear acrylic. Thus, the laminate of the example shows no significant discoloration after 1500 hours exposure in the Fadeometer wheras the same substrate protected only by film B (6 mils thick) begins to discolor at about 150 hours in the Fadeometer and the same substrate protected by a film of clear vinyl chloride-vinyl acetate copolymer discolors noticeably after 75 hours in the Fadeometer.

The tri-ply plastic laminate of the invention for the first time makes possible long-time weatherability using highly light-sensitive plastics such as rigid vinyl chloride-vinyl acetate copolymer sheet. Similar laminates may be prepared substituting other rigid light-sensitive plastic bases for the rigid vinyl chloride-vinyl acetate copolymer. Thus, laminates possessing similar long-time weatherability may be prepared from rigid and semirigid PVC homopolymer, rigid nylon, including nylon 6, nylon 66 and nylon 12, from ABS polymers, from polystyrene, etc. The double acrylic films may be placed on one or both sides of the rigid plastic depending on the use conditions to be met by the laminate. The double protective acrylic films used in the laminates of the invention not only impart long-time weatherability and resistance to ultraviolet degradation but also prevent loss of physical properties of the laminate on exposure to weather and result in a product having outstanding eye appeal.

Other variations of the invention will be obvious to those skilled in the art. Thus, the laminate may be formed using a press, a roll or other known laminating mechanisms. Where a printed message is desired, the message may be printed on the opaque acrylic film and then the three films constituting the laminate of the invention laminated in a single step rather than in successive steps with an intermediate printing step as described in the example.

What is claimed is:

1. A laminate comprising a rigid sheet of light sensitive plastic having laminated on at least one surface thereof an opaque preformed film, 1 to 10 mils thick, of a pigmented mass formed of fused particles of a multi-stage, heterogeneous copolymer of at least four sequentially polymerized components, each subsequent stage component partially or completely encompassing and penetrating to some degree into the particles obtained by the polymerization of the prior stage or stages, said copolymer comprising 10–75% by weight of a first-stage rubbery, uniformly crosslinked polymer of an alkyl acrylate having 2 to 8 carbon atoms in the alkyl group and a maximum glass transition temperature of −20 C., and 90–25% by weight of subsequently polymerized stages containing gradually diminishing amounts of a $C_2$–$C_8$ alkyl acrylate and gradually increasing amounts of a $C_1$–$C_4$ alkyl methacrylate, said opaque film, in turn, having laminated on the exposed surface thereof a clear preformed film of a thermoplastic acrylic polymer having a glass transition temperature of 20° C. to 80° C.

2. A laminate according to claim 1 wherein the light-sensitive plastic is a copolymer of vinyl chloride and vinyl acetate.

3. A laminate according to claim 1 wherein the opaque film contains from 12–20% by weight of pigment.

4. A laminate according to claim 1 wherein the clear film is selected from the group consisting of homopolymers of $C_2$–$C_4$ alkyl esters of methacrylic acid and copolymers of a lower alkyl ester of methacrylic acid with a $C_1$–$C_8$ alkyl acrylate.

5. A laminate according to claim 4 wherein the clear acrylic film is from about 0.5 to 5 mils thick and contains an ultraviolet absorber.

6. A laminate according to claim 1 wherein the light-sensitive plastic is a homopolymer of vinyl chloride.

7. A laminate according to claim 1 wherein the light-sensitive plastic is a copolymer of acrylonitrile, butadiene and styrene.

8. A laminate according to claim 1 wherein the light-sensitive plastic is a blend of polyvinyl chloride and a copolymer of acrylonitrile, butadiene and styrene.

9. A laminate according to claim 1 wherein the light-sensitive plastic is polystyrene.

10. A laminate according to claim 1 wherein the opaque film contains from 5 to 25% by weight of pigment.

References Cited

UNITED STATES PATENTS

| | | | |
|---|---|---|---|
| 3,194,725 | 7/1965 | Pounds | 161—254 |
| 3,249,463 | 5/1966 | Carlee | 260—901 |
| 3,297,621 | 1/1967 | Taft. | |
| 3,312,563 | 4/1967 | Rusch | 117—33.3 |

FOREIGN PATENTS 225,595  1/1958  Australia.

ROBERT F. BURNETT, Primary Examiner

LINDA M. CARLIN, Assistant Examiner

U.S. Cl. X.R.

117—161; 161—254, 165; 260—29.6